US012683179B2

(12) United States Patent

He et al.

(10) Patent No.: US 12,683,179 B2

(45) Date of Patent: Jul. 14, 2026

(54) DESULFURIZATION USING A MOLTEN CARBONATE FUEL CELL

(71) Applicant: EXXONMOBIL TECHNOLOGY AND ENGINEERING COMPANY, Annandale, NJ (US)

(72) Inventors: Fan He, Annandale, NJ (US); Lu Han, Beaumont, TX (US); Jonathan Rosen, Morristown, NJ (US); Timothy A. Barckholtz, Whitehouse Station, NJ (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 790 days.

(21) Appl. No.: 18/155,263

(22) Filed: Jan. 17, 2023

(65) Prior Publication Data

US 2023/0231169 A1 Jul. 20, 2023

Related U.S. Application Data

(60) Provisional application No. 63/300,955, filed on Jan. 19, 2022.

(51) Int. Cl.
*H01M 8/14* (2006.01)
*H01M 8/04119* (2016.01)
*H01M 8/244* (2016.01)

(52) U.S. Cl.
CPC ....... *H01M 8/141* (2013.01); *H01M 8/04119* (2013.01); *H01M 8/145* (2013.01); *H01M 8/244* (2013.01); *H01M 2008/147* (2013.01); *H01M 2300/0051* (2013.01)

(58) Field of Classification Search
CPC .. H01M 8/141; H01M 8/04119; H01M 8/145; H01M 8/244; H01M 2008/147; H01M 2300/0051
USPC .......................................................... 429/431
See application file for complete search history.

(56) References Cited

U.S. PATENT DOCUMENTS

| | | | |
|---|---|---|---|
| 2011/0207016 A1* | 8/2011 | Akiyama | H01M 4/92 |
| | | | 429/480 |
| 2013/0014484 A1 | 1/2013 | Caprile et al. | |
| 2014/0038070 A1* | 2/2014 | Papile | H01M 8/22 |
| | | | 429/502 |

(Continued)

OTHER PUBLICATIONS

Contreras et al. Molten carbonate fuel cells: a technological perspective and review. Energy Sources Part A, vol. 47, 2021, pp. 1-15; retrieved from https://www.tandfonline.com/doi/abs/10.1080/15567036.2021.2013346 (Year: 2021).*

(Continued)

*Primary Examiner* — James M Erwin

(74) *Attorney, Agent, or Firm* — Shook, Hardy & Bacon L.L.P.

(57) ABSTRACT

Systems and methods are provided for maintaining and/or improving operating lifetime for molten carbonate fuel cells that contain reforming catalyst in the anode when processing cathode input flows that contain sulfur oxides. The systems and methods can include a serial arrangement of molten carbonate fuel cells, where a first fuel cell includes a reduced or minimized amount of reforming catalyst in the anode. A second molten carbonate fuel cell can include reforming catalyst in the anode.

18 Claims, 6 Drawing Sheets

(56) References Cited

U.S. PATENT DOCUMENTS

| 2019/0321776 | A1* | 10/2019 | Lubomirsky | ........ | B01D 53/507 |
| 2020/0168936 | A1* | 5/2020 | Venkataraman | .. | H01M 8/04014 |
| 2020/0176787 | A1* | 6/2020 | Geary | ................. | H01M 8/0265 |
| 2020/0176791 | A1* | 6/2020 | Rosen | ................... | H01M 8/145 |
| 2020/0176800 | A1* | 6/2020 | O'Neal | ................. | H01M 8/145 |
| 2020/0287224 | A1* | 9/2020 | Jahnke | ................ | H01M 8/0662 |
| 2021/0159531 | A1* | 5/2021 | Rosen | ................. | H01M 8/0202 |

OTHER PUBLICATIONS

Kawase et al. Removal of H2S using molten carbonate at high temperature, Waste Management, vol. 33, 2013, pp. 2706-2712; retrieved from https://www.sciencedirect.com/science/article/pii/ S0956053X13003735 (Year: 2013).*
G. Manzolini et al., CO2 Separation From Combined Cycles Using Molten Carbonate Fuel Cells, Journal of Fuel Cell Science and Technology, Feb. 2012, vol. 9.
J. Milewski et al., Molten carbonate fuel cell operation under high concentrations of SO2 on the cathode side, International Journal of Hydrogen Energy, 2016, p. 18769-18777, vol. 41.

* cited by examiner 310
320
330
340
342
350
360
311

1

DESULFURIZATION USING A MOLTEN CARBONATE FUEL CELL

FIELD OF THE INVENTION

Systems and methods are provided for operating molten carbonate fuel cells in series to allow at least one fuel cell to be used as a desulfurization stage.

BACKGROUND OF THE INVENTION

Molten carbonate fuel cells utilize hydrogen and/or other fuels to generate electricity. The hydrogen may be provided by reforming methane or other reformable fuels in a steam reformer, such as steam reformer located upstream of the fuel cell or integrated within the fuel cell. Fuel can also be reformed in the anode cell in a molten carbonate fuel cell, which can be operated to create conditions that are suitable for reforming fuels in the anode. Still another option can be to perform some reforming both externally and internally to the fuel cell. Reformable fuels can encompass hydrocarbonaceous materials that can be reacted with steam and/or oxygen at elevated temperature and/or pressure to produce a gaseous product that comprises hydrogen.

An attractive feature of molten carbonate fuel cells is the ability to transport $CO_2$ from a low concentration stream (such as a cathode input stream) to a higher concentration stream (such as an anode output flow). During operation, $CO_2$ and $O_2$ in an MCFC cathode are converted to carbonate ions ($CO_3^{2-}$), which are then transported across the molten carbonate electrolyte as a charge carrier. The carbonate ion reacts with $H_2$ in the fuel cell anode to form $H_2O$ and $CO_2$. Thus, one of the net outcomes of operating the MCFC is transport of $CO_2$ across the electrolyte. This transport of $CO_2$ across the electrolyte can allow an MCFC to generate electrical power while reducing or minimizing the cost and/or challenge of sequestering carbon oxides from various CON-containing streams. For example, when an MCFC is paired with a combustion source, this can allow for additional power generation while reducing or minimizing the overall $CO_2$ emissions that result from power generation.

An article in the Journal of Fuel Cell Science and Technology (G. Manzolini et. al., *J. Fuel Cell Sci. and Tech.*, Vol. 9, February 2012) describes a power generation system that combines a combustion power generator with molten carbonate fuel cells. The combustion output from the combustion generator is used in part as the input for the cathode of the fuel cell. One goal of the simulations in the Manzolini article is to use the MCFC to separate $CO_2$ from the power generator's exhaust. Various arrangements of fuel cells and operating parameters are described. In an example configuration, two fuel cells are arranged with the cathode input flows in series, to allow for additional removal of $CO_2$ from the combustion output. The hydrogen for use in the anodes of the fuel cells is derived from reforming of a desulfurized natural gas feed. The sulfur content of the cathode input flows in the example is not described.

An article in the International Journal of Hydrogen Energy (J. Milewski et. al., *Int. J. Hydrogen Energy*, Vol. 41, 2016, p 18769-18777) describes the impact of $SO_2$ on molten carbonate fuel cell performance for $SO_2$ concentrations between 100 ppmv and 680 ppmv. Concentrations below 100 wppm were reported to not have an impact on fuel cell voltage.

U.S. Patent Application Publication 2020/0176800 describes catalyst patterns for use in a reforming element that is incorporated into a molten carbonate fuel cell stack.

SUMMARY OF THE INVENTION

In an aspect, a method for operating a plurality of fuel cells is provided. The method includes passing a first cathode input flow comprising $O_2$, 4.0 vol % or more of $CO_2$, and 20 ppbv or more of $SO_2$ into a first cathode of a first molten carbonate fuel cell. The method further includes passing a first anode input flow containing $H_2$ into a first anode of the first molten carbonate fuel cell. The first anode can have a) substantially no reforming catalyst, or b) less than 0.04 $g/cm^3$ of a reforming catalyst. The method further includes operating the first molten carbonate fuel cell, optionally at a $CO_2$ utilization of 5.0% to 60%, to produce a first cathode output flow and a first anode output flow. A ratio of $SO_2$ in the first cathode output flow to $SO_2$ in the first cathode input flow can optionally be 0.05 or less. The method further includes passing a second cathode input flow into a second cathode of a second molten carbonate fuel cell. The second cathode input flow can include at least a portion of the first cathode output flow. The second cathode input flow can include $O_2$, a $CO_2$ content of 3.0 vol % or more, and a $SO_2$ content that is lower than the $SO_2$ content of the first cathode input flow. The method further includes passing a second anode input flow comprising a reformable hydrocarbon into a second anode of the second molten carbonate fuel cell. The second anode can optionally have a reforming catalyst density of 0.06 $g/cm^3$ or more. Additionally, the method includes operating the second molten carbonate fuel cell at an average current density of 60 $mA/cm^2$ or more to produce electricity, a second cathode output flow, and a second anode output flow. Optionally, the second cathode input flow can have an $SO_2$ content of 10 ppbv or less.

In another aspect, a fuel cell system is provided. The system can include a first molten carbonate fuel cell having a first cathode, a first electrolyte, and a first anode. The first anode can have a) substantially no reforming catalyst, or b) a reforming catalyst density of less than 0.04 $g/cm^3$. The first cathode can have a first cathode outlet. The system further includes a second molten carbonate fuel cell having a second cathode, a second electrolyte, and a second anode. The second anode can include a reforming catalyst density of 0.06 $g/cm^3$ or more. The second cathode can have a second cathode inlet in fluid communication with the first cathode outlet. Additionally, the system includes one or more separation stages in fluid communication with at least one of a second anode outlet of the second anode and a first anode outlet of the first anode.

DETAILED DESCRIPTION OF THE EMBODIMENTS

Overview

Figure 1:
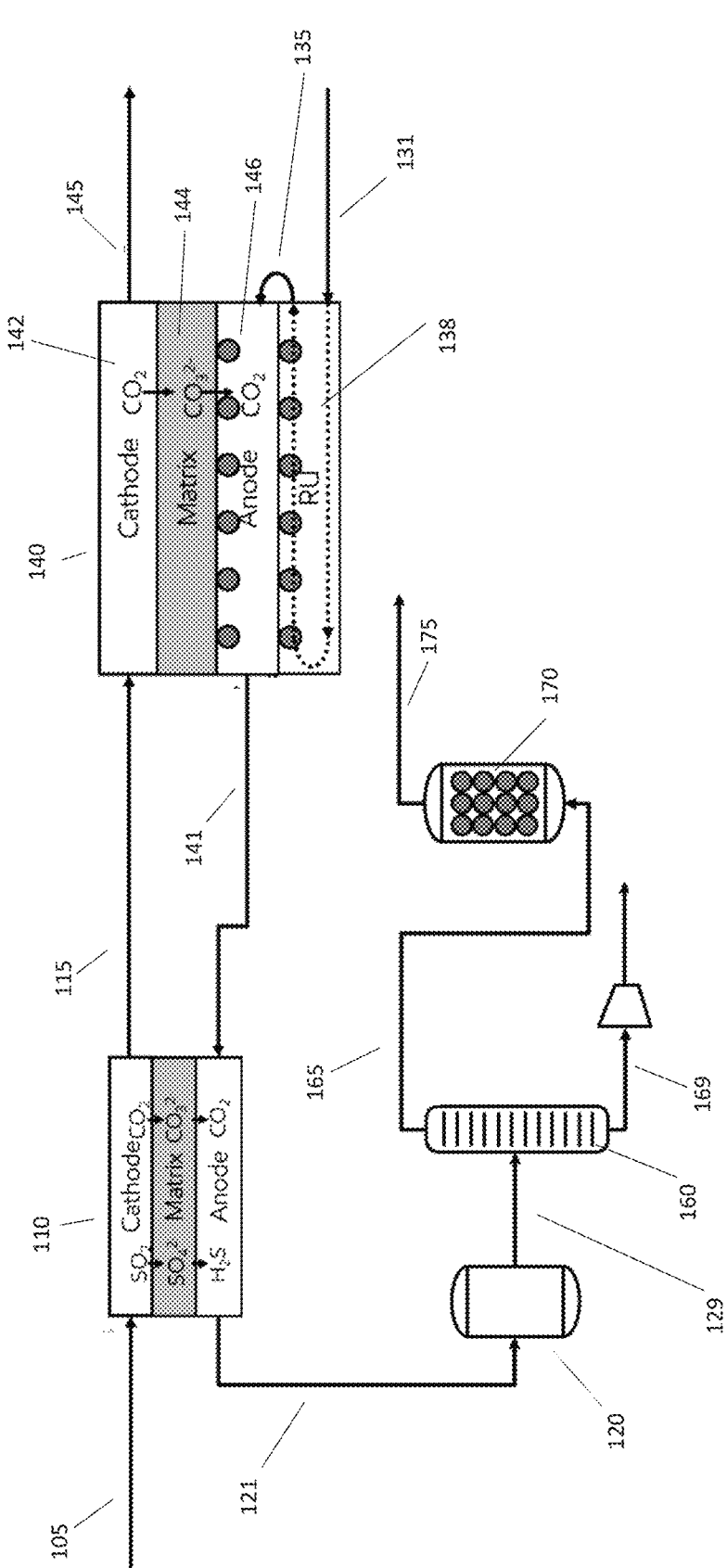
FIG. 1 shows an example of a configuration for using molten carbonate fuel cells arranged with serial cathodes to allow for $SO_2$ removal.

In various aspects, systems and methods are provided for maintaining and/or improving operating lifetime for molten carbonate fuel cells that contain reforming catalyst in the anode when processing cathode input flows that contain sulfur oxides. The systems and methods can include a serial arrangement of molten carbonate fuel cells, where a first fuel cell includes a reduced or minimized amount of reforming catalyst (such as down to having substantially no added reforming catalyst) in the anode. A second molten carbonate fuel cell can include reforming catalyst in the anode. During operation, the cathode input flows can be arranged so that the input flow containing sulfur oxides is initially passed through the first fuel cell that contains the reduced or minimized amount of reforming catalyst in the anode. As the cathode input flow is processed in first fuel cell, sulfur oxides in the cathode input flow can be transported across the electrolyte and into the anode, resulting in $H_2S$ formation in the anode of the first fuel cell. Due to the minimized amount or absence of reforming catalyst in the anode of the first fuel cell, any deactivation of catalyst in the anode of the first fuel cell is also reduced or minimized. The cathode exhaust from the first fuel cell, now with a substantially reduced content of sulfur oxides, can then be used as at least a portion of the cathode input flow for the second fuel cell. In some aspects, the anode flows can be configured in the opposite manner, so that the anode exhaust from the second fuel cell forms at least part of the anode input for the first fuel cell. In other aspects, the anode input flows for the fuel cells can be independently provided.

Incorporating reforming catalyst into the anode of a molten carbonate fuel cell can provide a variety of advantages. One substantial advantage is that performing reforming in the anode provides an endothermic reaction within a fuel cell. This can offset the exothermic nature of the net electrochemical reaction in the fuel cell. By providing an endothermic reaction that can act as a heat sink, the range of operating conditions for the fuel cell can be greatly expanded while reducing or minimizing negative impacts on fuel cell operating lifetime. Additionally, by including reforming catalyst in the anode, the anode can act as a secondary reforming location, in combination with another reforming element located upstream from the fuel cell. Due to the equilibrium nature of reforming, it can be difficult to achieve substantially complete reforming of hydrocarbons within a stream in a single reforming stage. Partially reforming a hydrocarbon stream in an initial stage, followed by additional reforming within a fuel cell anode, can reduce or minimize the amount of hydrocarbon that passes through the system without being converted to hydrogen.

One of the difficulties with expanding usage of MCFCs for processing a greater variety of $CO_2$-containing streams is that a variety of $CO_2$-containing streams also contain sulfur oxides (SOx). Sulfur oxides can be transported across the membrane of a MCFC, resulting in formation of $H_2S$. If reforming catalyst is present in the anode, the $H_2S$ formed in this manner can deactivate the reforming catalyst, resulting in reduced operating lifetime for the MCFC due to loss of reforming activity.

A variety of cathode input streams can include sulfur-containing compounds, such as sulfur oxides (SOx). At a sufficiently high concentration, the sulfur oxide content of a cathode input stream could be harmful to the metals in the cathode. However, the sensitivity of the metals in the cathode is relatively low, so SOx concentrations on the order of parts per million can be acceptable in a cathode input flow for avoiding damage to the cathode.

It has been discovered that concentrations of sulfur oxides substantially below 1 ppmv in a cathode input stream can have a substantial impact on the operating lifetime of a molten carbonate fuel cell due to catalyst deactivation in the fuel cell anode. Conventional methods for removing sulfur oxides, such as use of adsorbents, are typically effective for removal of $SO_2$ to roughly 1 ppmv. However, based on a variety of factors, it has been discovered that $SO_2$ concentrations of 5.0-900 ppbv (volume parts per billion), or 5.0-500 ppbv, or 5.0-200 ppbv, or 1.0 ppbv to 900 ppb, or 1.0 ppbv to 500 ppbv, or 1.0 ppbv to 200 ppbv, or 1.0 ppbv to 100 ppbv, can result in degradation of reforming catalyst activity in a fuel cell anode. This can substantially reduce the potential operating lifetime for a molten carbonate fuel cell that includes reforming catalyst in the anode. The loss of catalyst activity in the anode is due in part to transport of sulfur across the electrolyte in the fuel cell, where the sulfur is then converted to $H_2S$. It is conventionally understood that exposing various types of reforming catalyst to $H_2S$ can result in a reduction in catalyst activity.

Figure 5:
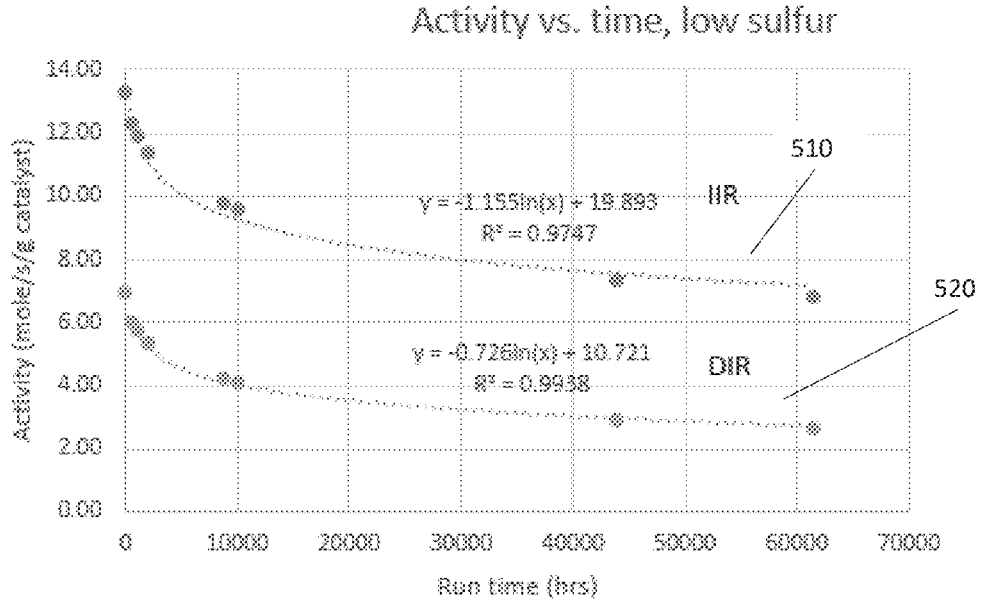
FIG. 5 shows reforming catalyst activity versus time based on exposure of the reforming catalyst to 1 ppbv of $SO_2$.
Figure 6:
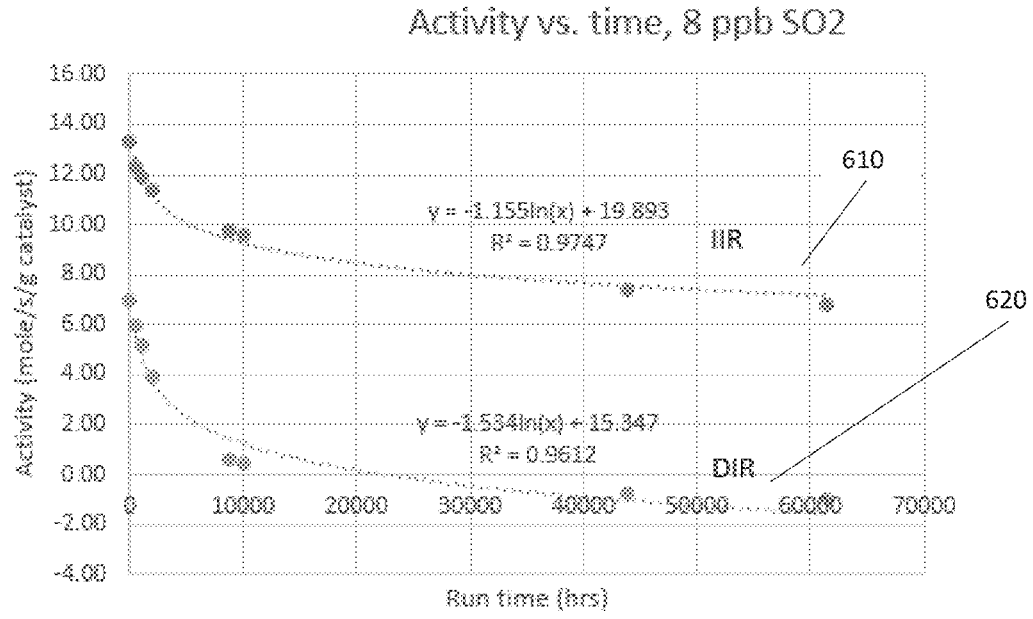
FIG. 6 shows reforming catalyst activity versus time based on exposure of the reforming catalyst to 8 ppbv of $SO_2$.

To illustrate the problem posed by low concentrations of $SO_2$ in a cathode flow, FIG. 5 and FIG. 6 show modeling results from a catalyst testing model. The catalyst testing model is designed to determine catalyst activity and lifetime in a simplified reaction environment. The model was used to roughly emulate the types of $SO_2$ exposure that reforming catalyst in an anode would be exposed to based on cathode input feed flows containing either 1.0 ppbv (volume part per billion) of $SO_2$, or 8.0 ppbv of $SO_2$. In FIG. 5, line 510 corresponds to the reforming catalyst included in the anode. Line 520 corresponds to reforming catalyst included in a separate reforming element that was included in the model fuel cell stack. Similarly, in FIG. 6, line 610 corresponds to reforming catalyst in the anode and line 620 corresponds to reforming catalyst in a separate reforming element.

As shown in FIG. 5, for a cathode input flow of 1.0 ppbv, the reforming catalyst in the anode retains roughly 37% of the initial catalyst activity after 7 years of operation. By contrast, at the 8.0 ppbv concentration shown in FIG. 6, the reforming catalyst is completely deactivated after only 2.5 years. As shown in FIG. 6, $SO_2$ concentrations well below 1 ppmv in the cathode input stream can result in substantial deactivation of reforming catalyst in the anode. Based on the data shown in FIG. 6, concentrations of $SO_2$ in a cathode input flow as low as 20 ppbv can result in substantially complete deactivation of reforming catalyst in an anode in time periods of less than a year. It is noted that the model assumes a uniform distribution of sulfur throughout a reaction environment. By contrast, in a fuel cell anode, it would be expected that $SO_2$ could be preferentially passed from the cathode to the anode, and therefore $SO_2$ would preferentially be transferred into the anode at locations near to where the $SO_2$ entered the cathode. However, the results shown in FIG. 5 and FIG. 6 qualitatively show that ppbv levels of $SO_2$ can reduce catalyst lifetime.

The preferential transport of $SO_2$ from cathode to anode in a molten carbonate fuel cell is due in part to the high thermodynamic driving force for transport of $SO_2$ across the electrolyte. The electrochemical potential for transport of $SO_2$ across the electrolyte is actually higher than the corresponding electrochemical potential for transport of $CO_2$.

Although the potential for sulfur poisoning can cause difficulties for reforming catalyst in the anode of a molten carbonate fuel cell, it has been discovered that the high thermodynamic driving force for transport of $SO_2$ from cathode to anode can also potentially provide an opportunity. Compared with conventional $SO_2$ adsorbents, such as ZnO or activated carbon, the transfer of $SO_2$ from cathode to anode in a molten carbonate fuel cell under relevant stack operating conditions (temperature, pressure) is thermodynamic highly favorable. This is based on the high absolute value of Gibbs free energy for the ion-exchange reaction between $SO_2$ and $CO_2$, as shown in Equation (1).

$$SO_2 + CO_3^{2-} + 0.5O_2 = SO_4^{2-} + CO_2, \qquad (1)$$

$$\Delta G = -293 kJ/mol @ 600 C, K = 3.3 \times 10^{17}$$

The theoretical selectivity is:

$$\text{Selectivity} = \frac{[SO_4^{2-}]/[SO_2]}{[CO_3^{2-}]/[CO_2]} \frac{1}{[O_2]^{0.5}} = e^{-\Delta G/RT} = K = 3.3 \times 10^{17} \qquad (2)$$

Thus, the driving force for transfer remains high even at low $SO_2$ concentrations. This indicates that a molten carbonate fuel cell can be used to separate $SO_2$ from other gas species in the flow gas with high theoretical selectivity and separation efficiency. Additionally or alternately, a molten carbonate fuel cell can reduce the sulfur concentration in the exhaust stream to a lower level than other gas species under the same or similar inlet concentration. Thus, if molten carbonate fuel cell is used as a device for removal of $SO_2$, such a fuel cell can perform $SO_2$ removal from cathode input flow streams that have $SO_2$ contents ranging from ppmv levels to ppbv levels without requiring substantial changes in operating conditions.

In various aspects, the difficulties associated with sulfur oxides being transported across the electrolyte in a molten carbonate fuel cell can be turned into an advantage by using a serial arrangement of molten carbonate fuel cells. In such a serial arrangement, a first MCFC can have an anode that is either substantially free of reforming catalyst or that contains a reduced or minimized amount of catalyst. This first MCFC can then be used to initially process a cathode input flow. It has been discovered that sulfur oxides are preferentially transported across the electrolyte in an MCFC, even when the sulfur oxides are present in low concentration and/or when the MCFC is operated at lower $CO_2$ utilization values. As a result, the sulfur oxides in the cathode input flow for the first MCFC can be substantially removed even though the fuel cell is operated at a relatively low $CO_2$ utilization. Due to the lack of reforming catalyst in the anode of the first MCFC, the $H_2S$ formed in the anode due to transport of sulfur oxides across the electrolyte does not result in substantial changes in fuel cell operation. The cathode output from the first MCFC can then be used as at least a portion of the cathode input flow for a second MCFC that includes reforming catalyst in the anode. Because the sulfur oxides have been substantially removed, any deactivation of the reforming catalyst in the anode of the second MCFC can be reduced or minimized. As a result, this type of serial configuration can operate with improved stability for reforming catalyst activity in a fuel cell anode when processing a cathode input flow that includes sulfur oxides.

As examples of the type of conditions that can be facilitated by using serial MCFCs, a $CO_2$-containing stream with an $SO_2$ content of 20 ppbv or more, or 100 ppbv or more, or 1.0 ppmv or more, can be used as the input flow for a first cathode of a first fuel cell. The resulting cathode output flow from the first cathode can have a reduced content of $SO_2$, due to a $SO_2$ utilization of 95% or more in the first MCFC. The resulting cathode output flow can then be used as the cathode input flow for a second MCFC that includes reforming catalyst. Because reforming catalyst is present, various options are available for operating the second MCFC. For example, the second MCFC can be operated for high $CO_2$ capture, so that the $CO_2$ utilization in the second MCFC is 60% or more, or 70% or more, or 80% or more, such as up to 90% or possibly still higher. By including reforming catalyst in the anode of the second MCFC, so that reforming is performed to offset the heat generated by the fuel cell, high $CO_2$ utilization can be achieved while maintaining an average current density of 60 $mA/cm^2$ or more, or 80 $mA/cm^2$ or more, or 100 $mA/cm^2$ or more, such as up to 250 $mA/cm^2$ or possibly still higher. Additionally or alternately, the second MCFC can be operated for production of $H_2$, so that the fuel utilization in the second MCFC is 60% or less, or 50% or less, or 40% or less, such as down to 10% or possibly still lower. The presence of reforming catalyst in the anode of the second fuel cell can allow additional $H_2$ to be generated while operating at low fuel utilization conditions, in order to increase or maximize $H_2$ production.

An additional advantage of using serial MCFCs for removal of $SO_2$ from a potential cathode input stream is that use of serial MCFCs can reduce or minimize the amount of feed conditioning that is required for using a cathode input stream. For example, when using MCFCs for $CO_2$ removal or separation from a flue gas or other $CO_2$-containing stream, it will already be necessary to adjust the temperature and/or pressure of the $CO_2$-containing stream to conditions suitable for use in an MCFC. Using one or more initial MCFCs for $SO_2$ removal can be achieved with little or no change in the temperature and/or pressure adjustment for the $CO_2$-containing stream. By contrast, $SO_2$ removal methods involving adsorbents or caustic solutions are typically performed at temperatures and/or pressures that are substantially different from MCFC operating conditions. Additionally, processing a $CO_2$-containing feed with a caustic solution can potentially add water to the stream. This can further dilute the stream, and thereby further increase the difficulty in increasing or maximizing capture of $CO_2$.

Still another advantage of using MCFCs for removal of $SO_2$ is that electrical power can also be generated during the $SO_2$ removal process. This can reduce or minimize the net costs associated with the sulfur removal, as the $SO_2$ removal process can provide electricity for use in one or more associated processes.

Yet another advantage can be the robustness of $SO_2$ removal under various conditions, including even open circuit voltage conditions. For example, when a process upset occurs, a fuel cell stack may temporarily operate under open circuit voltage conditions. During such an event, $CO_2$ is normally not transported in meaningful quantities across the electrolytes of the fuel cells in the fuel cell stack. However, due to the high thermodynamic driving force for $SO_2$ transport and the relatively low levels of $SO_2$ present in some types of $CO_2$-containing streams, sufficient $SO_2$ transport can occur under open cell voltage conditions to allow for sulfur removal. This ability to perform $SO_2$ removal for a limited period of time under open cell voltage conditions can potentially simplify various control and/or safety schemes for management of fuel cell stacks.

Definitions

In this discussion, a fuel cell can correspond to a single cell, with an anode and a cathode separated by an electrolyte. The anode and cathode can receive input gas flows to facilitate the respective anode and cathode reactions for transporting charge across the electrolyte and generating electricity. A fuel cell stack can represent a plurality of cells in an integrated unit. Although a fuel cell stack can include multiple fuel cells, the fuel cells can typically be connected in parallel and can function (approximately) as if they collectively represented a single fuel cell of a larger size. When an input flow is delivered to the anode or cathode of a fuel cell stack, the fuel stack can include flow channels for dividing the input flow between each of the cells in the stack and flow channels for combining the output flows from the individual cells. In this discussion, a fuel cell array can be used to refer to a plurality of fuel cells (such as a plurality of fuel cell stacks) that are arranged in series, in parallel, or in any other convenient manner (e.g., in a combination of series and parallel). A fuel cell array can include one or more stages of fuel cells and/or fuel cell stacks, where the anode/ cathode output from a first stage may serve as the anode/ cathode input for a second stage. It is noted that the anodes in a fuel cell array do not have to be connected in the same way as the cathodes in the array. For convenience, the input to the first anode stage of a fuel cell array may be referred to as the anode input for the array, and the input to the first cathode stage of the fuel cell array may be referred to as the cathode input to the array. Similarly, the output from the final anode/cathode stage may be referred to as the anode/ cathode output from the array. In aspects where a fuel cell stack includes separate reforming elements, it is noted that the anode input flow may first pass through a reforming element prior to entering one or more anodes associated with the reforming element.

It should be understood that reference to use of a fuel cell herein typically denotes a "fuel cell stack" composed of individual fuel cells, and more generally refers to use of one or more fuel cell stacks in fluid communication. Individual fuel cell elements (plates) can typically be "stacked" together in a rectangular array called a "fuel cell stack". Additional types of elements can also be included in the fuel cell stack, such as reforming elements. This fuel cell stack can typically take a feed stream and distribute reactants among all of the individual fuel cell elements and can then collect the products from each of these elements. When viewed as a unit, the fuel cell stack in operation can be taken as a whole even though composed of many (often tens or hundreds) of individual fuel cell elements. These individual fuel cell elements can typically have similar voltages (as the reactant and product concentrations are similar), and the total power output can result from the summation of all of the electrical currents in all of the cell elements, when the elements are electrically connected in series. Stacks can also be arranged in a series arrangement to produce high voltages. A parallel arrangement can boost the current. If a sufficiently large volume fuel cell stack is available to process a given exhaust flow, the systems and methods described herein can be used with a single molten carbonate fuel cell stack. In other aspects of the invention, a plurality of fuel cell stacks may be desirable or needed for a variety of reasons.

All numerical values within the detailed description and the claims herein are modified by "about" or "approximately" the indicated value, and take into account experimental error and variations that would be expected by a person having ordinary skill in the art.

$SO_2$ Removal Using Molten Carbonate Fuel Cells

Molten carbonate fuel cells provide electrical power based on transport of $CO_2$ from cathode to anode. In the cathode, $CO_2$ combines with $O_2$ plus electrons to form carbonate ions, which are then transported across the molten carbonate electrolyte. In the anode, the carbonate ions react with $H_2$ to form $CO_2$ and $H_2O$ while also releasing the electrons that were carried across the electrolyte.

$SO_2$ can be present in $CO_2$-containing streams for a variety of reasons. For $CO_2$-containing streams formed by combustion of a fuel using air as the oxidant, it is noted that air typically has an $SO_2$ concentration of roughly 1 to 10 ppbv in recent years. Thus, even simple combustion of a fuel with air can result in formation of a $CO_2$-containing stream containing ppbv levels of $SO_2$. Other types of $CO_2$-containing streams can include $SO_2$ due to sulfur contamination within the fuel used for combustion. Such $CO_2$-containing streams can include, but are not limited to, $CO_2$-containing streams derived from combustion of coal, petroleum, and/or biomass. Still other $CO_2$-containing streams can include sulfur based on the nature of a process that was used to form the stream. For example, in refinery and/or chemical production settings, various streams are generated that can include $CO_2$, sulfur compounds, and various quantities of fuel. Either prior to or after combustion, it can be desirable to remove $CO_2$ from such streams.

The conditions in the cathode and anode that facilitate transport of $CO_2$ are also suitable for transport of $SO_2$. It has been unexpectedly discovered that transport of 95% or more of the $SO_2$ in a feed can be achieved even when a fuel cell is operated at $CO_2$ utilization values of 60% or less, or 40% or less, or 20% or less. More generally, a MCFC can be used to transport 90% or more, or 95% or more, or 98% or more, or 99% or more of the $SO_2$ in a cathode input feed to the anode, depending on the operating conditions for the MCFC. As a result, a molten carbonate fuel cell can be used to reduce the $SO_2$ concentration of a potential cathode input feed from concentrations 200 ppmv (or possibly higher) down to ~10 ppbv (or possibly lower). For example, a molten carbonate fuel cell can be used to reduce an $SO_2$ concentration of a cathode input flow from 200 ppmv or less down to 20 ppbv or less, or 100 ppmv or less down to 10 ppbv or less, or 50 ppmv or less down to 5.0 ppbv or less, or 1.0 ppmv or less down to 1.0 ppbv or less or possibly still lower. Similarly, a molten carbonate fuel cell operated under relatively mild conditions (such as low $CO_2$ utilization conditions) can be used to reduce the $SO_2$ concentration of a potential cathode input feed from concentrations of 20 ppmv or less down to 20 ppbv or less, or 10 ppbv or less, or 5.0 ppbv or less, or 1.0 ppbv or less, or possibly still lower. It is noted that the detection limit for reliably determining $SO_2$ content is roughly 10 ppbv, so measured values of $SO_2$ that are less than 10 ppbv can have greater uncertainty associated with the measured values.

For cathode input flows with still lower initial $SO_2$ concentrations, a molten carbonate fuel cell operated under relatively mild conditions can be used to reduce the $SO_2$ concentration of a potential cathode input feed from concentrations of 100 ppbv to 1000 ppbv down to 10 ppbv or less, or 5.0 ppbv or less, or 1.0 ppbv or less, or possibly still lower. This can allow for formation of a cathode input flow for the second molten carbonate fuel cell that has a $SO_2$ concentration of 10 ppbv or less, or 5.0 ppbv or less, or 1.0 ppbv or less, such as down to having substantially no $SO_2$ content in the input flow for the second cathode.

In this discussion, transporting 90% or more of $SO_2$ in a cathode input flow to the anode corresponds to an $SO_2$ utilization of 90% or more. As an alternative, $SO_2$ utilization can also be expressed as a ratio of $SO_2$ in the cathode output flow relative to $SO_2$ in the cathode input flow. An $SO_2$ utilization of 90% or more corresponds to a ratio of $SO_2$ in the cathode output flow to $SO_2$ in the cathode input flow of 0.1 or less (e.g., 10 in the output versus 100 in the input, or 1 in the output versus 10 in the input). An $SO_2$ utilization of 95% or more corresponds to a ratio of $SO_2$ in the cathode output flow to $SO_2$ in the cathode input flow of 0.05 or less. An $SO_2$ utilization of 98% or more, or 99% or more, corresponds to a ratio of $SO_2$ in the cathode output flow to $SO_2$ in the cathode input flow of 0.02 or less, or 0.01 or less.

At least part of the reason that $SO_2$ concentrations well below 1.0 ppmv can result in rapid deactivation of reforming catalyst in the anode is due to the fact that the flow rate of the cathode input flow can often be a substantial multiple of the flow rate into the anode. Anode input flows tend to be relatively high purity with respect to the target components for an anode input stream. In particular, anode input flows can tend to be primarily composed of $H_2$, hydrocarbons used for forming $H_2$ by reforming, and/or other products typically present when reforming is used to make $H_2$ from hydrocarbons, such as CO, $CO_2$, and/or water. By contrast, many applications for MCFCs involve using a cathode input stream that is relatively dilute with respect to $CO_2$ concentration. For example, many types of flue gases from combustion reactions have $CO_2$ concentrations of less than 10 vol %. This is due in part to the fact that air is often used as the oxygen source for such reactions.

When the concentration of $CO_2$ in a cathode input flow is significantly lower than the $H_2$ concentration in the anode flow, based on the stoichiometry of the fuel cell reaction, either the utilization rates for $CO_2$ and $H_2$ will have to be substantially different, or the cathode input flow rate has to be higher than the anode input flow rate so that the molar quantity of $CO_2$ passing through the cathode per unit time is more similar to the molar quantity of $H_2$ passing through the anode per unit time. This can be expressed, for example, as a ratio of the volumetric flow rate of the cathode input flow versus the volumetric flow rate of the anode input flow. In some aspects, a ratio of the volumetric flow rate of the cathode input flow relative flow rate of the anode input flow can be 2.0 (i.e., 2:1) or higher, or 3.0 or higher, or 5.0 or higher, or 8.0 or higher, such as up to a ratio of 20 or possibly still higher.

While increasing the ratio of the cathode flow rate relative to the anode flow rate can be effective for providing additional $CO_2$ per unit time, the increased cathode flow rate means that the cathode is also exposed to a greater volume of any contaminants (such as $SO_2$) per unit time. When such differences in flow rate are present between the cathode input flow and the anode input flow, the concentration of $H_2S$ generated in the anode can be substantially higher than the concentration of $SO_2$ present in the cathode input flow. Thus, differences in flow rate between the cathode input flow and the anode input flow can contribute to an apparent increase in sulfur concentration in the anode as $SO_2$ is transported across the electrolyte and subsequently converted into $H_2S$.

Because a molten carbonate fuel cell can remove 95% or more, or 98% or more, or 99% or more, or 99.9% or more of the $SO_2$ from a cathode input stream substantially independent of initial $SO_2$ concentration, serial molten carbonate fuel cells can be used in a variety of configurations for handling cathode input streams with $SO_2$ content. For streams with relatively low $SO_2$ content (such as 1.0 ppmv or less), an MCFC (with little or no reforming catalyst in the anode) can be used for $SO_2$ removal in order to produce a cathode input stream suitable for introduction into a second MCFC that does include reforming catalyst in the anode. In aspects where a potential cathode input stream has an $SO_2$ content of greater than 1.0 ppmv, such as up to 200 ppmv or possibly still higher, an optional pre-removal stage can be used to reduce the $SO_2$ content to near or below 1.0 ppmv, followed by an MCFC for removal of $SO_2$ to values of less than 100 ppbv. The optional pre-removal stage can be another MCFC (without catalyst in the anode), an adsorber, or another convenient method for removal of $SO_2$ from a $CO_2$-containing stream.

In various aspects, a MCFC that is used for $SO_2$ removal from a cathode input flow can correspond to a MCFC with a reduced or minimized amount of reforming catalyst in the anode. This includes having substantially no reforming catalyst in the anode. In other aspects, the anode of the MCFC can have a reforming catalyst content of 0.04 $g/cm^3$ or less, or 0.02 $g/cm^3$ or less, such as down to substantially no reforming catalyst content. This can be in contrast to the anode of the second MCFC, where the anode can include a reforming catalyst density of 0.06 $g/cm^3$ or more, or 0.08 $g/cm^3$ or more, or 0.10 $g/cm^3$ or more, such as up to 0.50 $g/cm^3$ or possibly still higher.

Due to the reduced or minimized amount of reforming catalyst in the anode, an MCFC operated for sulfur removal can be operated under conditions that avoid excessive temperature peaks and/or differentials within the fuel cell. One way of characterizing the operating conditions of an MCFC can be based on the utilization rates of fuel ($U_f$) and/or $CO_2$ ($U_C$) in the MCFC.

Generally, an MCFC being used for $SO_2$ removal can be operated at any convenient fuel utilization ($U_f$). Thus, $U_f$ can generally be 90% or less, or 80% or less, such as down to the minimum $U_f$ value for maintaining stable operation of the fuel cell (e.g., 10% or possibly still lower). As a practical matter, however, operating at high values of $U_f$ can tend to result in generation of large amounts of heat due to the exothermic nature of the fuel cell reaction. In order to maintain a target temperature profile within the fuel cell, such as maintaining a maximum temperature (e.g., a peak internal temperature) within the fuel cell of 680° C. or less, the fuel cell can be operated at fuel utilizations ($U_f$) of 70% or less, or 60% or less, or 50% or less, or 40% or less, such as down to 10% or possibly still lower. It is noted that the fuel utilization value for maintaining a target temperature profile can vary depending on the $CO_2$ content of the cathode input flow and/or the $CO_2$ utilization. In some aspects, if the cathode input flow has a $CO_2$ concentration of 5.0 vol % or higher, or 8.0 vol % or higher, or 10 vol % or higher, (such as up to 100%), then the fuel utilization can be 60% or less, or 50% or less, or 40% or less, or 30% or less. In some aspects, if the $CO_2$ utilization is 60% or higher (such as up to 90%), then the fuel utilization can be 60% or less, or 50% or less, or 40% or less, or 30% or less. It is noted that as $CO_2$ concentration in the cathode input flow increases and/or as $CO_2$ utilization increases, lower values of fuel utilization can become beneficial for maintaining a target temperature profile.

Generally, an MCFC being used for $SO_2$ removal can be operated at any convenient $CO_2$ utilization ($U_C$). Thus, $U_C$ can generally be 90% or less, or 80% or less, such as down to the minimum $U_C$ value for maintaining stable operation of the fuel cell (e.g., 5.0% or possibly still lower). As a practical matter, however, operating at high values of $U_C$ results in generation of large amounts of heat due to the exothermic nature of the fuel cell reaction. In order to maintain a target temperature profile within the fuel cell, such as maintaining a maximum temperature within the fuel cell of 680° C. or less, the fuel cell can be operated at $CO_2$ utilization values ($U_C$) of 90% or less, or 80% or less, or 70% or less, or 60% or less, or 50% or less, or 40% or less, or 30% or less, such as down to 5.0% or possibly still lower.

Configuration Examples

FIG. 1 shows an example of a configuration for using serial molten carbonate fuel cells as part of processing of a cathode input stream that includes $SO_2$. The configuration shown in FIG. 1 could be used, for example, for carbon capture from a flue gas stream (at high $CO_2$ utilization in the second MCFC), for production of excess hydrogen (at low fuel utilization in the second MCFC), and/or for various other purposes.

The configuration shown in FIG. 1 includes a first MCFC 110 (including little or no reforming catalyst in the anode) and a second MCFC 140 (including reforming catalyst in the anode). It is understood that first MCFC 110 and second MCFC 140 can independently represent any convenient number of fuel cells and/or fuel cell stacks in any flow configuration operated in series and/or parallel.

In FIG. 1, first MCFC 110 includes a cathode 112, an electrolyte 114, and an anode 116. In some aspects, first MCFC 110 can represent a stack of MCFCs with cathodes 112, electrolytes 114, and anodes 116. Second MCFC 140 (or second stack of MCFCs 140) includes cathode(s) 142, electrolyte(s) 144, and anode(s) 146. Second MCFC 140 is also thermally integrated with a reforming element 130. For example, in aspects where second MCFC 140 represents a MCFC stack, reforming element 130 can correspond to a reforming elements that are included in the MCFC stack on a periodic basis, such as having one reforming element per each 3-10 fuel cells in the stack.

In FIG. 1, the cathode 112 of first MCFC 110 and the cathode 142 of second MCFC 140 are connected in a serial manner, so that the cathode output flow 115 from cathode 112 serves as the cathode input flow for cathode 142. The anodes in FIG. 1 are also connected serially, but in the reverse manner. Thus, anode output flow 141 from second anode 146 serves as the anode input flow for anode 116.

During operation, cathode input flow 105 is introduced into first cathode 112. Cathode input flow 105 can include both $CO_2$ and $SO_2$. Operation of fuel cell 110 results in production of cathode output flow 115, which has a reduced content of both $CO_2$ and $SO_2$. The fuel cell 110 can be operated at a convenient $CO_2$ utilization, such as a $CO_2$ utilization between 5%-60%. This can result in transport of 5%-60% of the $CO_2$ from cathode input flow 105 across the electrolyte 114 and into anode 116. This also results in transport of 95% or more (or 99% or more, or 99.9% or more) of the $SO_2$ from cathode input flow 105 across the electrolyte 114 and into anode 116. This also results in formation of cathode output flow 115, which still has a large $CO_2$ content, but with a substantially reduced $SO_2$ content.

In the example shown in FIG. 1, cathode output flow 115 is passed into second cathode 142. Optionally, the cathode input flow for second cathode 142 can correspond to a portion of cathode output flow 115. Optionally, an additional stream (not shown) can be incorporated into the cathode input flow for second cathode 142, such as an additional oxygen stream and/or an additional $CO_2$-containing stream. Preferably, if an additional $CO_2$-containing stream is added, the additional $CO_2$-containing stream can have a $SO_2$ content that is lower than the $SO_2$ content of the first cathode output flow. In some aspects, if an additional $CO_2$-containing stream is added to the cathode input flow for the second cathode, the ratio of volume of $SO_2$ in the first cathode output flow to the volume of $SO_2$ in the second cathode input flow can be between 0.5 to 5.0 (i.e., between 1:2 and 5:1). In other aspects, the second cathode input flow can consist essentially of the first cathode output flow, so that the only $CO_2$-containing stream introduced into the second cathode is derived from the first cathode output flow. In such aspects where the second cathode input flow consists essentially of at least a portion of the first cathode output flow, an oxygen-containing stream can optionally be added to the second cathode input flow.

In still other aspects, the serial configuration of fuel cells can be organized so that the number of fuel cells being operated for sulfur removal (with little or no reforming catalyst in the anode) is less than or greater than the number of fuel cells being operated that have substantial reforming catalyst in the anode. For example, one option for performing sulfur removal can be to operate a first fuel cell (having little or no reforming catalyst in the anode) with a relatively high flow velocity in the cathode. Because the thermodynamic driving force for $SO_2$ removal is relatively high, this can be effective for removing $SO_2$ to a target level for a large volume of gas, even though the $CO_2$ utilization and/or the power generation from the first fuel cell may be somewhat low. The resulting cathode output flow from the first fuel cell can then be used to provide cathode input flows for a plurality of second fuel cells that are operated at lower flow velocities in the cathode. These second fuel cells can include reforming catalyst in the anode, since the $SO_2$ is removed by the first fuel cell. This type of configuration can allow one first fuel cell to serve two to five second fuel cells, or possibly more. More generally, any convenient number of first fuel cells can be used to generate cathode output flows with reduced $SO_2$ content for use as cathode input flows for any convenient number of second fuel cells that include reforming catalyst in the anode.

Because cathode output flow 115 has a reduced or minimized $SO_2$ content, any transport of $SO_2$ to second anode 146 is also reduced or minimized. Second MCFC 140 can be operated at a higher level of $CO_2$ utilization, such as a $CO_2$ utilization of 50% to 90%. This can transport $CO_2$ from second cathode 142 across electrolyte 144 and into second anode 146. A second cathode output stream 145 exits from second cathode 142. The second cathode output stream corresponds to a $CO_2$-depleted stream. In some aspects, second cathode output stream can have a $CO_2$ concentration of 0.5 vol % to 2.0 vol %, or 0.5 vol % to 1.5 vol %, or 0.1 vol % to 2.0 vol %, or 0.1 vol % to 1.5 vol %, or 0.1 vol % to 1.0 vol %. It is noted that second MCFC can represent a plurality of MCFCs, and therefore potentially represents MCFCs connected in series in order to achieve a target level of $CO_2$ in the cathode output flow from the final serially connected MCFC.

For the anode flows, a stream containing reformable hydrocarbons 131 is introduced into reforming element 138. The reforming element 138 can at least partially reform the hydrocarbon stream 131 to form a stream 135 that includes a mixture of $H_2$ and hydrocarbons. The stream 135 can then be introduced into second anode 146. By performing reforming in the one or more second MCFC anodes 146, the second MCFC(s) 140 can be operated at elevated fuel utilization, elevated $CO_2$ utilization, and/or elevated current density while still maintaining a target temperature profile within the one or more second MCFCs. The anode output flow 141 can then be used as at least a portion of the anode input flow for first anode(s) 116. First anode(s) 116 generate a $CO_2$-enriched stream 121. It is noted that any $H_2S$ formed in anode 116 is incorporated into $CO_2$-enriched stream 121.

The $CO_2$-enriched stream 121 can then undergo additional processing to remove $SO_2$ and separate $CO_2$ from the remaining components in the stream. In the example configuration shown in FIG. 1, the $CO_2$-enriched stream 121 is passed into a water knockout drum 120, where the stream is cooled to remove water. The dewatered stream 129 is then passed into a separation stage 160 for separation of $CO_2$ from the remaining components in dewatered stream 129. It is noted that at this point, depending on the nature of anode input flow 141, dewatered stream 129 can contain $CO_2$ and a variety of gases that are difficult to convert into a condensed phase. These gases can include $CH_4$ (and/or other light hydrocarbons for reforming), $H_2$ and/or $CO$ (formed by the reforming reaction and not consumed by the MCFCs), and $H_2S$ (primarily due to formation in the first anode 116 after transport of $SO_2$ across electrolyte 114). An example of a separator that can separate $CO_2$ from such gases is a cryogenic separator, which can form a $CO_2$ output 169 that includes 80 vol % or more $CO_2$, or 90 vol % or more $CO_2$, such as up to 100 vol % $CO_2$. The non-condensable gases can exit as a remaining gas phase stream 165. The remaining gas phase stream 165 can then be passed through an $H_2S$ adsorption stage 170 to form a desulfurized residual stream 175. The desulfurized residual stream 175 can include an $H_2S$ content of 100 ppbv or less, or 50 ppbv or less, or 10 ppbv or less, or 1.0 ppbv or less, such as down to having substantially no $H_2S$ content.

It is noted that the separation scheme shown in FIG. 1 represents one possible separation scheme. For many of the elements shown in FIG. 1, the exact ordering of separation processes is not critical. For example, instead of having $H_2S$ adsorption stage 170 occur after $CO_2$ separator 160, the $H_2S$ removal may be performed before the $H_2$/$CO_2$ separation. Also, variations/additions to the separation train can be made. For example, a water gas shift reactor can be added after the MCFC stack to shift $CH_4$ and $CO$ to $H_2$ and $CO_2$ before separating $CO_2$ and the other gases.

Figure 2:
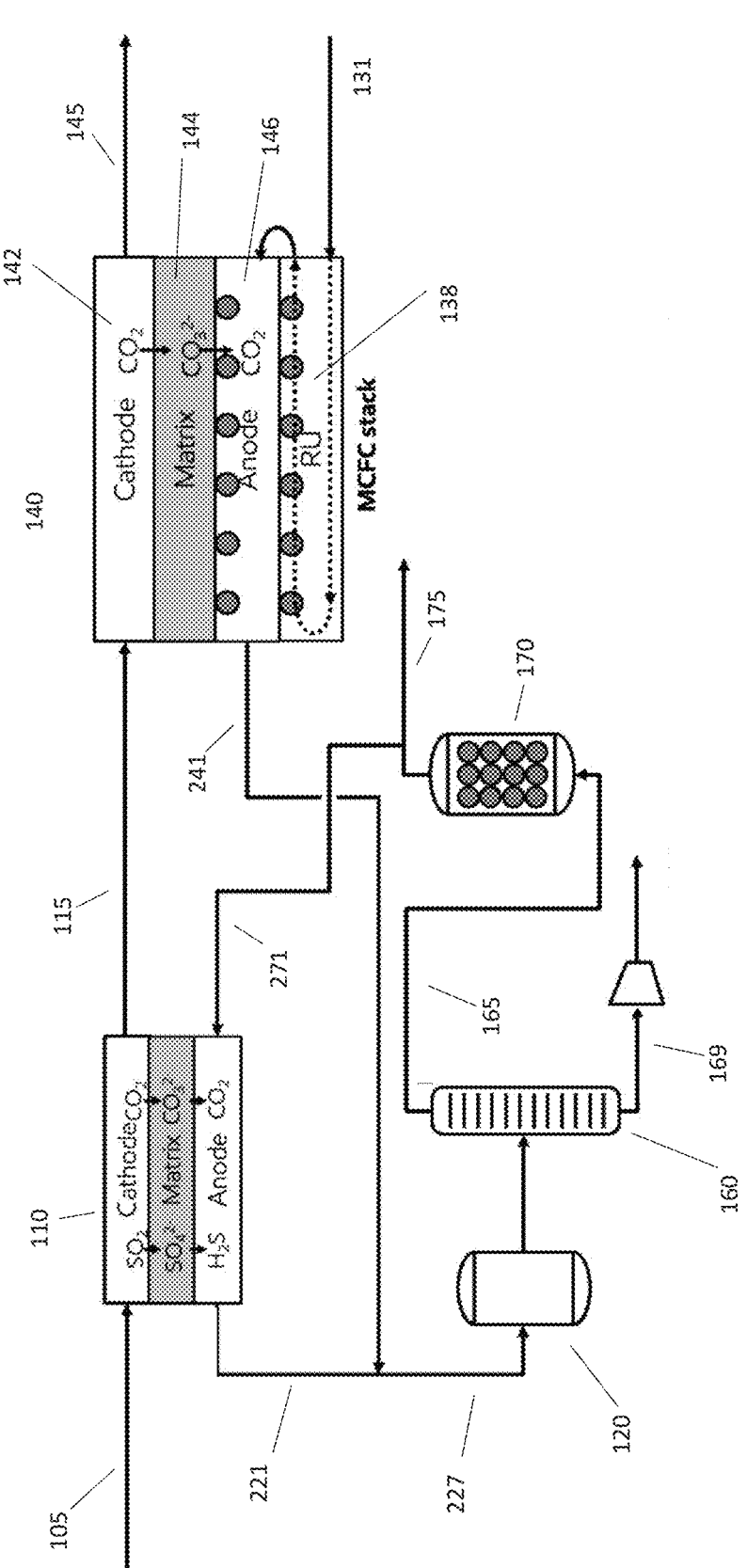
FIG. 2 shows another example of a configuration for using molten carbonate fuel cells arranged with serial cathodes to allow for $SO_2$ removal.

FIG. 2 shows another example of a potential configuration for using serial MCFCs to allow for processing of sulfur-containing cathode input flows while still performing substantial anode reforming. In FIG. 2, the first cathode 112 and the second cathode 142 are still connected in series in a manner similar to FIG. 1. However, the flow path for the anodes is different. In FIG. 2, the anode exhaust 241 from the second anode 146 is passed into the processing system for separating $SO_2$ and $CO_2$ from the remaining components of the anode exhaust. Prior to entering water knockout stage 120, the anode exhaust 241 is combined with the first anode output 221 to form a combined stream 227. The input flow for the first anode 116 corresponds to a portion 271 of the desulfurized residual stream 175. It is noted that the configuration in FIG. 2 is also intended to be representative, and that variations in the order of operations and/or additions or modifications to the separation stages can be made.

The configurations shown in FIG. 1 and FIG. 2 have different advantages. In some aspects, the configuration in FIG. 1 can be beneficial in aspects where the space velocity for flows in the first cathode and/or the first anode is substantially different. For example, one way to reduce $CO_2$ utilization in a fuel cell is to increase the cathode flow rate. Due to the higher rate of $SO_2$ transport across the electrolyte during fuel cell operation, operating with low $CO_2$ utilization can still allow 95% or more (or 99% or more, or 99.9% or more) of the $SO_2$ to be removed from a cathode input flow. This can allow the cathode output flow from one first MCFC to provide cathode input flows for a plurality of second MCFCs. Additionally or alternately, the first MCFC can be sized so that the first MCFC is substantially smaller than the second MCFC. This can provide cost savings by reducing or minimizing the amount of MCFCs required for the first MCFC. As another example, the configuration in FIG. 2 can be beneficial if more substantial $CO_2$ removal is performed in the first MCFC. When the anode output from the second anode is used as the input flow for the first anode, the resulting input flow for the first anode can include a substantial amount of $CO_2$. This can make it difficult to operate the first MCFC at higher levels of $CO_2$ capture, due to the low purity of $H_2$ in the input flow to the first anode. The configuration shown in FIG. 2 can overcome this problem by using a portion of the desulfurized residual stream as the input flow for the first anode. It is noted that in aspects where the anode feed is nearly pure $H_2$ with some $CH_4$ and $CO$, the current density and power can be relatively high because of the high $CO_2$ concentration in the cathode and high $H_2$ concentration in the anode.

General Molten Carbonate Fuel Cell Structure

Figure 3:
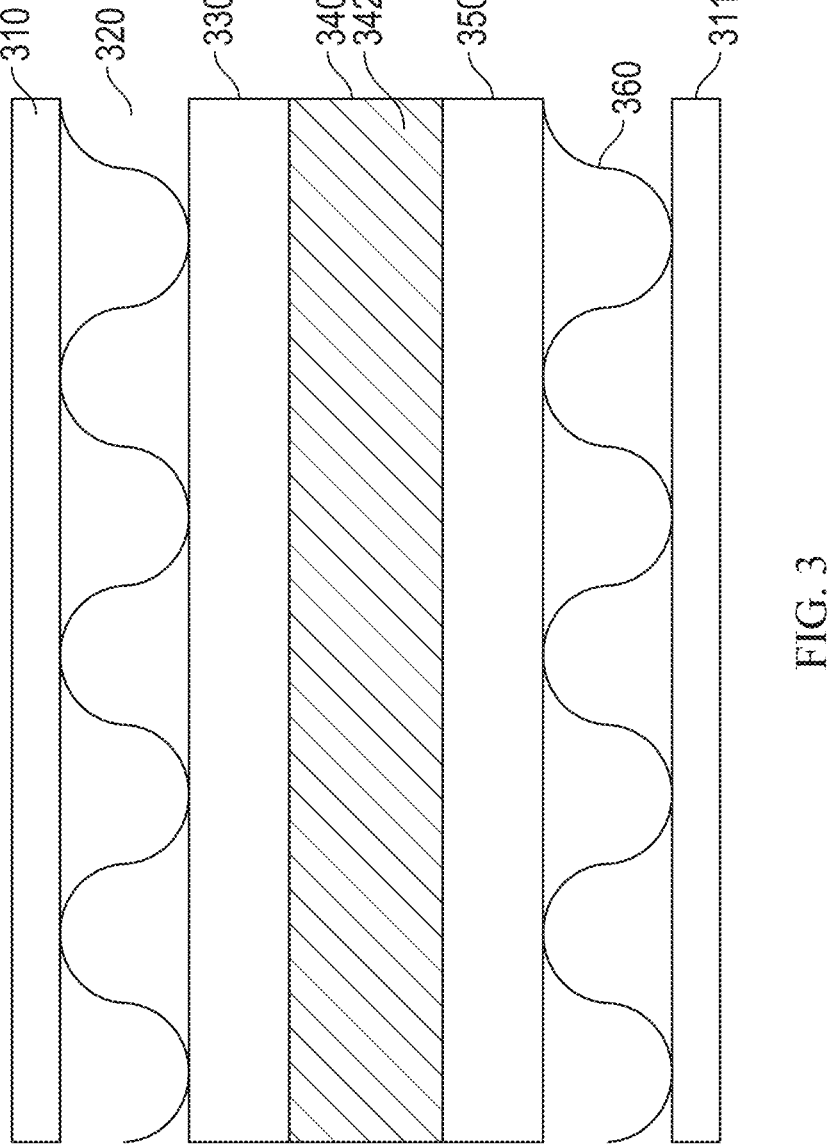
FIG. 3 shows an example of a molten carbonate fuel cell.

FIG. 3 shows a general example of a portion of a molten carbonate fuel cell stack. The portion of the stack shown in FIG. 3 corresponds to a fuel cell. In order to isolate the fuel cell from adjacent fuel cells in the stack and/or other elements in the stack, the fuel cell includes separator plates 310 and 311. In FIG. 3, the fuel cell includes an anode 330 and a cathode 350 that are separated by an electrolyte matrix 340 that contains an electrolyte 342. In various aspects, cathode 350 can correspond to a dual-layer (or multi-layer) cathode. Anode collector 320 provides electrical contact between anode 330 and the other anodes in the stack, while cathode collector 360 provides similar electrical contact between cathode 350 and the other cathodes in the fuel cell stack. Additionally, anode collector 320 allows for introduction and exhaust of gases from anode 330, while cathode collector 360 allows for introduction and exhaust of gases from cathode 350. The shape of anode collector 320 in FIG. 3 is intended to represent the concept that curved structures (such as curved protrusions from a plate-like surface) can be used to provide contact between anode collector 320 and either anode 330 or separator plate 310. For example, such curved structures can reside above a gap in the anode collector 320 to allow fluid to flow into and out of anode 330. Any other convenient shape can be used, including having at least one surface that corresponds to a plate-like surface with openings to allow gas to pass through the plate-like surface. Cathode collector 360 is similarly represented by curved surfaces, with the understanding that any other convenient shape could also be used.

During operation, $CO_2$ is passed into the cathode collector 360 along with $O_2$. The $CO_2$ and/or $O_2$ can be derived from any convenient source, such as air or flue gas from a combustion device. The $CO_2$ and $O_2$ diffuse into the porous cathode 350 and travel to a cathode interface region near the boundary of cathode 350 and electrolyte matrix 340. In the cathode interface region, a portion of electrolyte 342 can be present in the pores of cathode 350. The $CO_2$ and $O_2$ can be converted near/in the cathode interface region to carbonate ion ($CO_3^{2-}$), which can then be transported across electrolyte 342 (and therefore across electrolyte matrix 340) to facilitate generation of electrical current. In aspects where alternative ion transport is occurring, a portion of the $O_2$ can be converted to an alternative ion, such as a hydroxide ion or a peroxide ion, for transport in electrolyte 342. After transport across the electrolyte 342, the carbonate ion (or alternative ion) can reach an anode interface region near the boundary of electrolyte matrix 340 and anode 330. The carbonate ion can be converted back to $CO_2$ and $H_2O$ in the presence of $H_2$, releasing electrons that are used to form the current generated by the fuel cell. This can occur, for example, in the presence of electrolyte 342 within the pores of electrolyte matrix 340. The $H_2$ and/or a hydrocarbon suitable for forming $H_2$ are introduced into anode 330 via anode collector 320.

Figure 4:
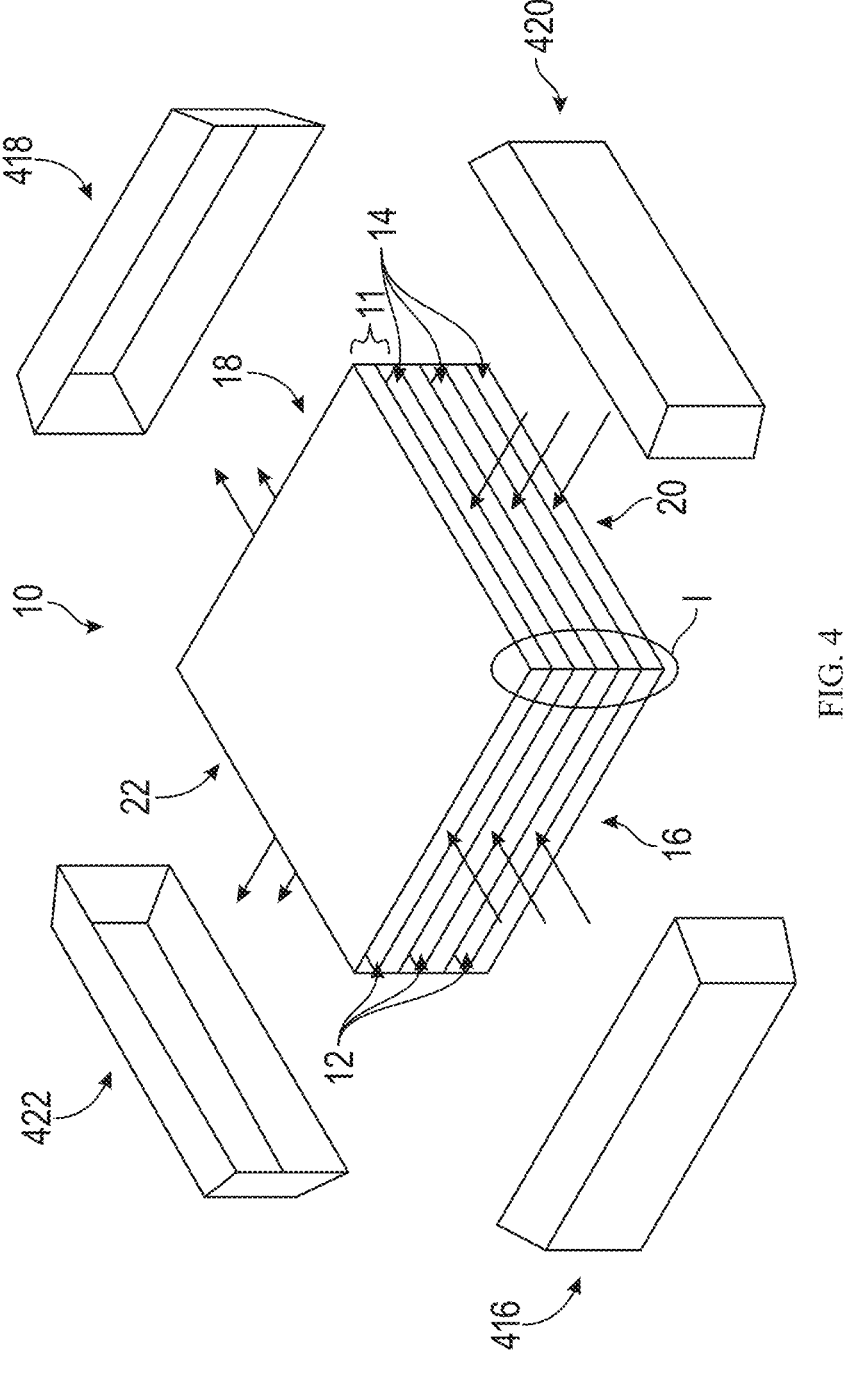
FIG. 4 shows an example of a portion of a molten carbonate fuel cell stack.

Referring to FIG. 4, a conventional fuel cell stack 10 includes a plurality of fuel cells 11 (such as the fuel cell shown in FIG. 3), each having an anode layer 12 (comprising an anode electrode and an anode flow chamber/current collector, not shown) and a cathode layer 14 (comprising a cathode electrode and an cathode flow chamber/current collector, not shown), with the fuel cells stacked one on top of another and so on. The fuel cell stack 10 includes an anode inlet side (or stack face) 16 configured to receive anode feed gas and an opposing anode outlet side (or stack face) 18 configured to output anode exhaust after it has passed through an anode layer 12. The anode feed gas may be provided via an external manifold (anode inlet manifold 416) adjacent to and sealed against the anode inlet stack face 16. For reference purposes, the external manifolds depicted in FIG. 4 have been removed from the fuel cell stack 10. To be clear, during operation, external manifolds (e.g., anode inlet manifold 416) would be sealed against corresponding fuel stack face. The anode exhaust may be received by another external manifold adjacent to and sealed against the anode outlet stack face 18 (anode outlet manifold 418). The fuel cell stack 10 further includes a cathode inlet side (or stack face) 20 configured to receive cathode feed gas and an opposing cathode outlet side (or stack face) 22 configured to output cathode exhaust after it has passed through a cathode layer 14. The cathode feed gas may be provided via an external manifold adjacent to and sealed against the cathode inlet stack face 20 (cathode inlet manifold 420). The cathode exhaust may be received by another external manifold sealed against the cathode outlet stack face 22 (cathode outlet manifold 422). In some embodiments, at least three of the four stack faces may have external manifolds sealed against each stack face. For example, the stack may be housed in sealed housing (e.g., module) and the anode inlet side, the anode outlet side, and the cathode inlet side may be sealed with external manifolds. The cathode outlet side in this example may be open to the sealed housing.

It is noted that the stack shown in FIG. 4 corresponds to a "cross-flow" configuration, where the axis of flow in the anode is substantially perpendicular to the axis of flow in the cathode. In various aspects, the anode and the cathode in a fuel cell can be oriented in any convenient manner, including co-current flow, counter-current flow, or cross-flow.

Anode Inputs and Outputs

In various aspects, the anode input stream for a MCFC can include hydrogen, a hydrocarbon such as methane, a hydrocarbonaceous or hydrocarbon-like compound that may contain heteroatoms different from C and H, or a combination thereof. The source of the hydrogen/hydrocarbon/hydrocarbon-like compounds can be referred to as a fuel source. In some aspects, most of the methane (or other hydrocarbon, hydrocarbonaceous, or hydrocarbon-like compound) fed to the anode can typically be fresh methane. In this description, a fresh fuel such as fresh methane refers to a fuel that is not recycled from another fuel cell process. For example, methane recycled from the anode outlet stream back to the anode inlet may not be considered "fresh" methane, and can instead be described as reclaimed methane.

The fuel source used can be shared with other components, such as a turbine that uses a portion of the fuel source to provide a $CO_2$-containing stream for the cathode input. The fuel source input can include water in a proportion to the fuel appropriate for reforming the hydrocarbon (or hydrocarbon-like) compound in the reforming section that generates hydrogen. For example, if methane is the fuel input for reforming to generate $H_2$, the molar ratio of water to fuel can be from about one to one to about ten to one, such as at least about two to one. A ratio of four to one or greater is typical for external reforming, but lower values can be typical for internal reforming. To the degree that $H_2$ is a portion of the fuel source, in some optional aspects no additional water may be needed in the fuel, as the oxidation of $H_2$ at the anode can tend to produce $H_2O$ that can be used for reforming the fuel. The fuel source can also optionally contain components incidental to the fuel source (e.g., a natural gas feed can contain some content of $CO_2$ as an additional component). For example, a natural gas feed can contain $CO_2$, $N_2$, and/or other inert (noble) gases as additional components. Optionally, in some aspects the fuel source may also contain CO, such as CO from a recycled portion of the anode exhaust. An additional or alternate potential source for CO in the fuel into a fuel cell assembly can be CO generated by steam reforming of a hydrocarbon fuel performed on the fuel prior to entering the fuel cell assembly.

More generally, a variety of types of fuel streams may be suitable for use as an anode input stream for the anode of a molten carbonate fuel cell. Some fuel streams can correspond to streams containing hydrocarbons and/or hydrocarbon-like compounds that may also include heteroatoms different from C and H. In this discussion, unless otherwise specified, a reference to a fuel stream containing hydrocarbons for an MCFC anode is defined to include fuel streams containing such hydrocarbon-like compounds. Examples of hydrocarbon (including hydrocarbon-like) fuel streams include natural gas, streams containing C1-C4 carbon compounds (such as methane or ethane), and streams containing heavier C5+ hydrocarbons (including hydrocarbon-like compounds), as well as combinations thereof. Still other additional or alternate examples of potential fuel streams for use in an anode input can include biogas-type streams, such as methane produced from natural (biological) decomposition of organic material.

In some aspects, a molten carbonate fuel cell can be used to process an input fuel stream, such as a natural gas and/or hydrocarbon stream, with a low energy content due to the presence of diluent compounds. For example, some sources of methane and/or natural gas are sources that can include substantial amounts of either $CO_2$ or other inert molecules, such as nitrogen, argon, or helium. Due to the presence of elevated amounts of $CO_2$ and/or inerts, the energy content of a fuel stream based on the source can be reduced. Using a low energy content fuel for a combustion reaction (such as for powering a combustion-powered turbine) can pose difficulties. However, a molten carbonate fuel cell can generate power based on a low energy content fuel source with a reduced or minimal impact on the efficiency of the fuel cell. The presence of additional gas volume can require additional heat for raising the temperature of the fuel to the temperature for reforming and/or the anode reaction. Additionally, due to the equilibrium nature of the water gas shift reaction within a fuel cell anode, the presence of additional $CO_2$ can have an impact on the relative amounts of $H_2$ and CO present in the anode output. However, the inert compounds otherwise can have only a minimal direct impact on the reforming and anode reactions. The amount of $CO_2$ and/or inert compounds in a fuel stream for a molten carbonate fuel cell, when present, can be at least about 1 vol %, such as at least about 2 vol %, or at least about 5 vol %, or at least about 10 vol %, or at least about 15 vol %, or at least about 20 vol %, or at least about 25 vol %, or at least about 30 vol %, or at least about 35 vol %, or at least about 40 vol %, or at least about 45 vol %, or at least about 50 vol %, or at least about 75 vol %. Additionally or alternately, the amount of $CO_2$ and/or inert compounds in a fuel stream for a molten carbonate fuel cell can be about 90 vol % or less, such as about 75 vol % or less, or about 60 vol % or less, or about 50 vol % or less, or about 40 vol % or less, or about 35 vol % or less.

Yet other examples of potential sources for an anode input stream can correspond to refinery and/or other industrial process output streams. For example, coking is a common process in many refineries for converting heavier compounds to lower boiling ranges. Coking typically produces an off-gas containing a variety of compounds that are gases at room temperature, including CO and various $C_1$-$C_4$ hydrocarbons. This off-gas can be used as at least a portion of an anode input stream. Other refinery off-gas streams can additionally or alternately be suitable for inclusion in an anode input stream, such as light ends ($C_1$-$C_4$) generated during cracking or other refinery processes. Still other suitable refinery streams can additionally or alternately include refinery streams containing CO or $CO_2$ that also contain $H_2$ and/or reformable fuel compounds.

Still other potential sources for an anode input can additionally or alternately include streams with increased water content. For example, an ethanol output stream from an ethanol plant (or another type of fermentation process) can include a substantial portion of $H_2O$ prior to final distillation. Such $H_2O$ can typically cause only minimal impact on the operation of a fuel cell. Thus, a fermentation mixture of alcohol (or other fermentation product) and water can be used as at least a portion of an anode input stream.

Biogas, or digester gas, is another additional or alternate potential source for an anode input. Biogas may primarily comprise methane and $CO_2$ and is typically produced by the breakdown or digestion of organic matter. Anaerobic bacteria may be used to digest the organic matter and produce the biogas. Impurities, such as sulfur-containing compounds, may be removed from the biogas prior to use as an anode input.

The output stream from an MCFC anode can include $H_2O$, $CO_2$, CO, and $H_2$. Optionally, the anode output stream could also have unreacted fuel (such as $H_2$ or $CH_4$) or inert compounds in the feed as additional output components. Instead of using this output stream as a fuel source to provide heat for a reforming reaction or as a combustion fuel for heating the cell, one or more separations can be performed on the anode output stream to separate the $CO_2$ from the components with potential value as inputs to another process, such as $H_2$ or CO. The $H_2$ and/or CO can be used as a syngas for chemical synthesis, as a source of hydrogen for chemical reaction, and/or as a fuel with reduced greenhouse gas emissions.

Cathode Inputs and Outputs

Conventionally, a molten carbonate fuel cell can be operated based on drawing a desired load while consuming some portion of the fuel in the fuel stream delivered to the anode. The voltage of the fuel cell can then be determined by the load, fuel input to the anode, air and $CO_2$ provided to the cathode, and the internal resistances of the fuel cell. The $CO_2$ to the cathode can be conventionally provided in part by using the anode exhaust as at least a part of the cathode input stream. By contrast, the present invention can use separate/different sources for the anode input and cathode input. By removing any direct link between the composition of the anode input flow and the cathode input flow, additional options become available for operating the fuel cell, such as to generate excess synthesis gas, to improve capture of carbon dioxide, and/or to improve the total efficiency (electrical plus chemical power) of the fuel cell, among others.

One example of a suitable $CO_2$-containing stream for use as a cathode input flow can be an output or exhaust flow from a combustion source. Examples of combustion sources include, but are not limited to, sources based on combustion of natural gas, combustion of coal, and/or combustion of other hydrocarbon-type fuels (including biologically derived fuels). Additional or alternate sources can include other types of boilers, fired heaters, furnaces, and/or other types of devices that burn carbon-containing fuels in order to heat another substance (such as water or air). Depending on the source, the $CO_2$ content of a $CO_2$-containing stream and/or a cathode input flow can be 3.0 vol % or more, or 4.0 vol % or more, or 6.0 vol % or more, or 8.0 vol % or more, or 10 vol % or more, or 12 vol % or more, such as up to 25 vol % or possibly still higher. In some aspects, the $CO_2$-containing stream and/or cathode input flow can have a $CO_2$ content of 3.0 vol % to 25 vol %, or 3.0 vol % to 15 vol %, or 3.0 vol % to 10 vol %, or 5.0 vol % to 25 vol %, or 5.0 vol % to 15 vol %, or 5.0 vol % to 10 vol %. It is noted that the $CO_2$ concentration could approach 100 vol % (less the amount required for addition of $O_2$), but it is less typical that high purity $CO_2$ streams are used as a cathode input stream for a fuel cell.

Other potential sources for a cathode input stream can additionally or alternately include sources of bio-produced $CO_2$. This can include, for example, $CO_2$ generated during processing of bio-derived compounds, such as $CO_2$ generated during ethanol production. An additional or alternate example can include $CO_2$ generated by combustion of a bio-produced fuel, such as combustion of lignocellulose. Still other additional or alternate potential $CO_2$ sources can correspond to output or exhaust streams from various industrial processes, such as $CO_2$-containing streams generated by plants for manufacture of steel, cement, and/or paper.

Yet another additional or alternate potential source of $CO_2$ can be $CO_2$-containing streams from a fuel cell. The $CO_2$-containing stream from a fuel cell can correspond to a cathode output stream from a different fuel cell, an anode output stream from a different fuel cell, a recycle stream from the cathode output to the cathode input of a fuel cell, and/or a recycle stream from an anode output to a cathode input of a fuel cell. For example, an MCFC operated in standalone mode under conventional conditions can generate a cathode exhaust with a $CO_2$ concentration of at least about 5 vol %. Such a $CO_2$-containing cathode exhaust could be used as a cathode input for an MCFC operated according to an aspect of the invention. More generally, other types of fuel cells that generate a $CO_2$ output from the cathode exhaust can additionally or alternately be used, as well as other types of $CO_2$-containing streams not generated by a "combustion" reaction and/or by a combustion-powered generator. Optionally but preferably, a $CO_2$-containing stream from another fuel cell can be from another molten carbonate fuel cell. For example, for molten carbonate fuel cells connected in series with respect to the cathodes, the output from the cathode for a first molten carbonate fuel cell can be used as the input to the cathode for a second molten carbonate fuel cell.

In addition to $CO_2$, a cathode input stream can include $O_2$ to provide the components necessary for the cathode reaction. Some cathode input streams can be based on having air as a component. For example, a combustion exhaust stream can be formed by combusting a hydrocarbon fuel in the presence of air. Such a combustion exhaust stream, or another type of cathode input stream having an oxygen content based on inclusion of air, can have an oxygen content of about 20 vol % or less, such as about 15 vol % or less, or about 10 vol % or less. Additionally or alternately, the oxygen content of the cathode input stream can be at least about 4 vol %, such as at least about 6 vol %, or at least about 8 vol %. More generally, a cathode input stream can have a suitable content of oxygen for performing the cathode reaction. In some aspects, this can correspond to an oxygen content of about 5 vol % to about 15 vol %, such as from about 7 vol % to about 9 vol %. For many types of cathode input streams, the combined amount of $CO_2$ and $O_2$ can correspond to less than about 21 vol % of the input stream, such as less than about 15 vol % of the stream or less than about 10 vol % of the stream. An air stream containing oxygen can be combined with a $CO_2$ source that has low oxygen content. For example, the exhaust stream generated by burning coal may include a low oxygen content that can be mixed with air to form a cathode inlet stream.

In addition to $CO_2$ and $O_2$, a cathode input stream can also be composed of inert/non-reactive species such as $N_2$, $H_2O$, and other typical oxidant (air) components. For example, for a cathode input derived from an exhaust from a combustion reaction, if air is used as part of the oxidant source for the combustion reaction, the exhaust gas can include typical components of air such as $N_2$, $H_2O$, and other compounds in minor amounts that are present in air. Depending on the nature of the fuel source for the combustion reaction, additional species present after combustion based on the fuel source may include one or more of $H_2O$, oxides of nitrogen (NOx) and/or sulfur (SOx), and other compounds either present in the fuel and/or that are partial or complete combustion products of compounds present in the fuel, such as CO. These species may be present in amounts that do not poison the cathode catalyst surfaces though they may reduce the overall cathode activity. Such reductions in performance may be acceptable, or species that interact with the cathode catalyst may be reduced to acceptable levels by known pollutant removal technologies.

The amount of $O_2$ present in a cathode input stream (such as an input cathode stream based on a combustion exhaust) can advantageously be sufficient to provide the oxygen needed for the cathode reaction in the fuel cell. Thus, the volume percentage of $O_2$ can advantageously be at least 0.5 times the amount of $CO_2$ in the exhaust. Optionally, as necessary, additional air can be added to the cathode input to provide sufficient oxidant for the cathode reaction. When some form of air is used as the oxidant, the amount of $N_2$ in the cathode exhaust can be at least about 78 vol %, e.g., at least about 88 vol %, and/or about 95 vol % or less. In some aspects, the cathode input stream can additionally or alternately contain compounds that are generally viewed as contaminants, such as $H_2S$ or $NH_3$. In other aspects, the cathode input stream can be cleaned to reduce or minimize the content of such contaminants.

A suitable temperature for operation of an MCFC can be between about 450° C. and about 750° C., such as at least about 500° C., e.g., with an inlet temperature of about 550° C. and an outlet temperature of about 625° C. In some aspects, the maximum temperature within a fuel cell can be limited to 700° C. or less, or 680° C. or less, in order to maintain longer operating life for the fuel cell. Prior to entering the cathode, heat can be added to or removed from the cathode input stream, if desired, e.g., to provide heat for other processes, such as reforming the fuel input for the anode. For example, if the source for the cathode input stream is a combustion exhaust stream, the combustion exhaust stream may have a temperature greater than a desired temperature for the cathode inlet. In such an aspect, heat can be removed from the combustion exhaust prior to use as the cathode input stream. Alternatively, the combustion exhaust could be at very low temperature, for example after a wet gas scrubber on a coal-fired boiler, in which case the combustion exhaust can be below about 100° C. Alternatively, the combustion exhaust could be from the exhaust of a gas turbine operated in combined cycle mode, in which the gas can be cooled by raising steam to run a steam turbine for additional power generation. In this case, the gas can be below about 50° C. Heat can be added to a combustion exhaust that is cooler than desired.

Example—MCFC Selectivity for $SO_2$ Versus $CO_2$

A series of test runs were performed using an MCFC to determine the relative selectivity for transport of $SO_2$ and $CO_2$ during fuel cell operation. The tests were performed using a 4 inch×4 inch fuel cell (roughly 10 cm by 10 cm) that was operated at various levels of $CO_2$ utilization. The $CO_2$ utilization rate was varied by varying the flow rate for the cathode input flow. $CO_2$ utilizations of 75%, 45%, 22.5%, and 11% were tested to determine the amount of $SO_2$ utilization.

The fuel cell was operated under open circuit voltage conditions at 650° C. The cathode input flow was a 1:1 molar ratio of $CO_2$ and $O_2$, with 200 ppbv of $SO_2$ included in the flow. The anode was provided with an $H_2$-containing stream.

Figure 7:
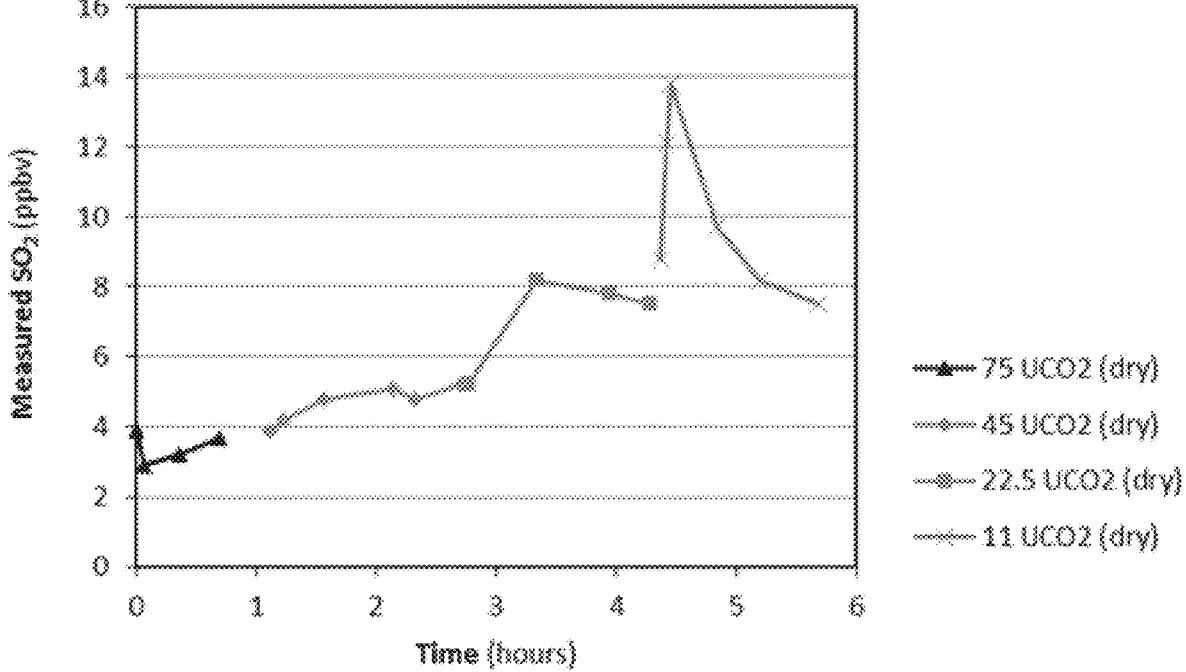
FIG. 7 shows measurements of $SO_2$ cathode output flow for a molten carbonate fuel cell operated with various levels of $CO_2$ utilization.

FIG. 7 shows the results from operating the fuel cell at the various $CO_2$ utilization values. As shown in FIG. 7, the $SO_2$ concentration in the exhaust increases with decreasing $CO_2$ utilization.

The nature of the increase in FIG. 7 can be further examined by calculating a separation factor. The separation factor compares the relative amount of $SO_2$ used by the fuel cell during operation with the amount of $CO_2$. Mathematically, the separation factor can be expressed as $$\text{Seperation factor} = \frac{[SO2]_{out}/[SO2]_{in}}{[CO2]_{out}/[CO2]_{in}} \qquad (3)$$

In Equation 1, the numerator corresponds to the percentage of $SO_2$ remaining in the cathode output stream, while the denominator corresponds to the percentage of $CO_2$ remaining in the cathode output stream. Thus, the separation factor provides a way to characterize the $SO_2$ utilization for a fuel cell for a given level of $CO_2$ utilization. Table 1 shows the separation factor for the various $CO_2$ utilization conditions shown in FIG. 7.

TABLE 1

| | | Separation Efficiency | | | |
| --- | --- | --- | --- | --- | --- |
| Uc (%) | U (m/s) | $SO_2$, out (ppbv) | $SO_2$, out/ $SO_2$, in (%) | $CO_2$, out/ $CO_2$, in (%) | Separation factor |
| 75 | 0.514 | 2~2.5 | 1~1.25 | 25 | 0.040~0.050 |
| 45 | 0.857 | 5 | 2.5 | 55 | 0.045 |
| 22.5 | 1.713 | 7~8 | 3.5~4 | 77.5 | 0.045~0.052 |
| 11 | 3.212 | 8~14 | 4~7 | 89 | 0.045~0.079 |

As shown in Table 1, the separation factor remains relatively constant as the $CO_2$ utilization varies. In other words, the amount of $SO_2$ removed from the cathode input flow remains proportional to the amount of $CO_2$ removed, even at low $CO_2$ utilization values. Because $SO_2$ is preferentially removed, at 11% $CO_2$ utilization, the amount of $SO_2$ removal is still roughly 95%. This demonstrates that relatively mild operating conditions for an MCFC can be used to perform $SO_2$ removal at a level of 95% or higher.

Additional Embodiments

Embodiment 1. A method for operating a plurality of fuel cells, comprising: passing a first cathode input flow comprising $O_2$, 4.0 vol % or more of $CO_2$, and 20 ppbv or more of $SO_2$ into a first cathode of a first molten carbonate fuel cell; passing a first anode input flow comprising $H_2$ into a first anode of the first molten carbonate fuel cell, the first anode comprising a) substantially no reforming catalyst, or b) less than 0.04 $g/cm^3$ of a reforming catalyst; operating the first molten carbonate fuel cell to produce a first cathode output flow and a first anode output flow, a ratio of $SO_2$ in the first cathode output flow to $SO_2$ in the first cathode input flow being 0.05 or less; passing a second cathode input flow into a second cathode of a second molten carbonate fuel cell, the second cathode input flow comprising at least a portion of the first cathode output flow, the second cathode input flow comprising $O_2$, a $CO_2$ content of 3.0 vol % or more, and a $SO_2$ content that is lower than the $SO_2$ content of the first cathode input flow; passing a second anode input flow comprising a reformable hydrocarbon into a second anode of the second molten carbonate fuel cell, the second anode optionally comprising a reforming catalyst density of 0.06 $g/cm^3$ or more; and operating the second molten carbonate fuel cell at an average current density of 60 $mA/cm^2$ or more to produce electricity, a second cathode output flow, and a second anode output flow.

Embodiment 2. The method of Embodiment 1, wherein the second cathode input flow comprises 10 ppbv or less of $SO_2$.

Embodiment 3. The method of any of the above embodiments, wherein the first cathode input flow comprises 20 ppbv to 200 ppbv of $SO_2$, and wherein the first cathode output flow comprises 5 ppbv or less of $SO_2$, or wherein the first cathode input flow comprises 1.0 ppmv to 100 ppmv of $SO_2$, and wherein the first cathode output flow comprises 50 ppbv or less of $SO_2$.

Embodiment 4. The method of any of the above embodiments, wherein a ratio of the volume of $SO_2$ in the second cathode input flow to the volume of $SO_2$ in the first cathode output flow is 0.5 to 5.0.

Embodiment 5. The method of any of the above embodiments, wherein the first anode inlet flow comprises at least a portion of the second anode output flow.

Embodiment 6. The method of any of the above embodiments, separating the first anode output flow to form at least a $CO_2$ product comprising 90 wt % or more $CO_2$ and a desulfurized stream comprising $H_2$, the desulfurized stream comprising 50 ppbv or less of $H_2S$, the first anode input flow optionally comprising at least a portion of the desulfurized stream.

Embodiment 7. The method of any of the above embodiments, wherein operating the first molten carbonate fuel cell comprises operating the first molten carbonate fuel cell at a $CO_2$ utilization of 5.0% to 60%.

Embodiment 8. The method of any of the above embodiments, wherein operating the second molten carbonate fuel cell comprises operating the second molten carbonate fuel cell at a $CO_2$ utilization of 70% or more, or wherein operating the second molten carbonate fuel cell comprises operating the second molten carbonate fuel cell at a fuel utilization of 50% or less, or a combination thereof.

Embodiment 9. The method of any of the above embodiments, wherein the first molten carbonate fuel cell is operated at a peak internal cell temperature of 680° C. or less.

Embodiment 10. The method of any of the above embodiments, wherein the second cathode input flow consists essentially of at least a portion of the first cathode output flow.

Embodiment 11. A fuel cell system, comprising: a first molten carbonate fuel cell, comprising a first cathode, a first electrolyte, and a first anode, the first anode comprising a) substantially no reforming catalyst, or b) a reforming catalyst density of less than 0.04 $g/cm^3$, the first cathode comprising a first cathode outlet; a second molten carbonate fuel cell, comprising a second cathode, a second electrolyte, and a second anode, the second anode comprising a reforming catalyst density of 0.06 $g/cm^3$ or more, the second cathode comprising a second cathode inlet in fluid communication with the first cathode outlet; and one or more separation stages in fluid communication with at least one of a second anode outlet of the second anode and a first anode outlet of the first anode.

Embodiment 12. The fuel cell system of Embodiment 11, wherein the one or more separation stages are in fluid communication with the first anode outlet, and wherein the first anode comprises a first anode inlet in fluid communication with the second anode outlet.

Embodiment 13. The fuel cell system of Embodiment 11, wherein the one or more separation stages comprise an $H_2S$ adsorbent stage, the desulfurization stage comprising a desulfurized stream outlet, and wherein the one or more separation stages are in fluid communication with the second anode outlet, and wherein the first anode comprises a first anode inlet in fluid communication with the desulfurized stream outlet.

Embodiment 14. The fuel cell system of any of Embodiments 11-13, wherein the second molten carbonate fuel cell comprises a fuel cell within a fuel cell stack, the fuel cell stack further comprising a reforming element, the reforming element being in fluid communication with a second anode inlet of the second anode.

Embodiment 15. The fuel cell system of any of Embodiments 11-14, wherein the system comprises a plurality of second molten carbonate fuel cells comprising a plurality of second cathode inlets, the plurality of second cathode inlets being in fluid communication with the first cathode outlet.

Although the present invention has been described in terms of specific embodiments, it is not necessarily so limited. Suitable alterations/modifications for operation under specific conditions should be apparent to those skilled in the art. It is therefore intended that the following claims be interpreted as covering all such alterations/modifications that fall within the true spirit/scope of the invention.

The invention claimed is:

1. A method for operating a plurality of fuel cells, comprising:

passing a first cathode input flow comprising $O_2$, 4.0 vol % or more of $CO_2$, and 20 ppbv or more of $SO_2$ into a first cathode of a first molten carbonate fuel cell;

passing a first anode input flow comprising $H_2$ into a first anode of the first molten carbonate fuel cell, the first anode comprising a) substantially no reforming catalyst, or b) less than 0.04 $g/cm^3$ of a reforming catalyst;

operating the first molten carbonate fuel cell to produce a first cathode output flow and a first anode output flow, a ratio of $SO_2$ in the first cathode output flow to $SO_2$ in the first cathode input flow being 0.05 or less;

passing a second cathode input flow into a second cathode of a second molten carbonate fuel cell, the second cathode input flow comprising at least a portion of the first cathode output flow, the second cathode input flow comprising $O_2$, a $CO_2$ content of 3.0 vol % or more, and a $SO_2$ content that is lower than the $SO_2$ content of the first cathode input flow;

passing a second anode input flow comprising a reformable hydrocarbon into a second anode of the second molten carbonate fuel cell; and operating the second molten carbonate fuel cell at an average current density of 60 $mA/cm^2$ or more to produce electricity, a second cathode output flow, and a second anode output flow, wherein a ratio of the volume of $SO_2$ in the second cathode input flow to the volume of $SO_2$ in the first cathode output flow is 0.5 to 5.0.

2. The method of claim 1, wherein the second anode comprises a reforming catalyst density of 0.06 $g/cm^3$ or more.

3. The method of claim 1, wherein operating the first molten carbonate fuel cell comprises operating the first molten carbonate fuel cell at a $CO_2$ utilization of 5.0% to 60%.

4. The method of claim 1, wherein the first cathode input flow comprises 20 ppbv to 200 ppbv of $SO_2$, and wherein the first cathode output flow comprises 5 ppbv or less of $SO_2$.

5. The method of claim 1, wherein the first cathode input flow comprises 1.0 ppmv to 100 ppmv of $SO_2$, and wherein the first cathode output flow comprises 50 ppbv or less of $SO_2$.

6. The method of claim 1, wherein the second cathode input flow comprises 10 ppbv or less of $SO_2$.

7. The method of claim 1, wherein the first anode input inlet-flow comprises at least a portion of the second anode output flow.

8. The method of claim 1, separating the first anode output flow to form at least a $CO_2$ product comprising 90 wt % or more $CO_2$ and a desulfurized stream comprising $H_2$, the desulfurized stream comprising 50 ppbv or less of $H_2S$.

9. The method of claim 8, wherein the first anode input flow comprises at least a portion of the desulfurized stream.

10. The method of claim 1, wherein operating the second molten carbonate fuel cell comprises operating the second molten carbonate fuel cell at a $CO_2$ utilization of 70% or more.

11. The method of claim 1, wherein operating the second molten carbonate fuel cell comprises operating the second molten carbonate fuel cell at a fuel utilization of 50% or less.

12. The method of claim 1, wherein the first molten carbonate fuel cell is operated at a peak internal cell temperature of 680° C. or less.

13. The method of claim 1, wherein the second cathode input flow consists essentially of at least a portion of the first cathode output flow.

14. A fuel cell system, comprising:

a first molten carbonate fuel cell, comprising a first cathode, a first electrolyte, and a first anode, the first anode comprising a) substantially no reforming catalyst, or b) a reforming catalyst density of less than 0.04 $g/cm^3$, the first cathode comprising a first cathode outlet;

a second molten carbonate fuel cell, comprising a second cathode, a second electrolyte, and a second anode, the second anode comprising a reforming catalyst density of 0.06 $g/cm^3$ or more, the second cathode comprising a second cathode inlet in fluid communication with the first cathode outlet; and one or more separation stages in fluid communication with at least one of a second anode outlet of the second anode and a first anode outlet of the first anode, wherein the one or more separation stages comprise an $H_2S$ adsorbent stage, the desulfurization stage comprising a desulfurized stream outlet.

15. The fuel cell system of claim 14, wherein the one or more separation stages are in fluid communication with the first anode outlet, and wherein the first anode comprises a first anode inlet in fluid communication with the second anode outlet.

16. The fuel cell system of claim 14, wherein the one or more separation stages are in fluid communication with the second anode outlet, and wherein the first anode comprises a first anode inlet in fluid communication with the desulfurized stream outlet.

17. The fuel cell system of claim 14, wherein the second molten carbonate fuel cell comprises a fuel cell within a fuel cell stack, the fuel cell stack further comprising a reforming element, the reforming element being in fluid communication with a second anode inlet of the second anode.

18. The fuel cell system of claim 14, wherein the system comprises a plurality of second molten carbonate fuel cells comprising a plurality of second cathode inlets, the plurality of second cathode inlets being in fluid communication with the first cathode outlet.

* * * * *